United States Patent [19]
DeClaire

[11] 3,911,302
[45] Oct. 7, 1975

[54] WHEEL SPEED SENSOR MODULE ASSEMBLY

[75] Inventor: Gerald DeClaire, Bloomfield Hills, Mich.

[73] Assignee: Rockwell International Corporation, Pittsburgh, Pa.

[22] Filed: Nov. 27, 1974

[21] Appl. No.: 527,609

[52] U.S. Cl. ............................... 310/168; 310/268
[51] Int. Cl.² ..................................... H02K 19/20
[58] Field of Search .......................... 310/168–170, 310/155, 89, 268, 67; 324/174

[56] References Cited
UNITED STATES PATENTS

| | | | |
|---|---|---|---|
| 3,626,226 | 12/1971 | Pauwels et al. | 310/168 |
| 3,626,227 | 12/1971 | Ritsema | 310/168 |
| 3,745,392 | 7/1973 | Phoenix et al. | 310/168 |
| 3,761,751 | 9/1973 | Fink et al. | 310/168 |
| 3,772,550 | 11/1973 | Anselmino | 310/168 |
| 3,812,391 | 5/1974 | Johnson et al. | 310/168 |
| 3,826,933 | 7/1974 | Anselmino | 310/168 |

*Primary Examiner*—Donovan F. Duggan

[57] ABSTRACT

A magnetic sensor module is for a wheel speed sensor assembly that is capable of being installed in association with a wheel rotatably mounted on an axle and includes an annular rotor adapted to be coaxially aligned with and connected to the wheel for rotation therewith. The magnetic sensor module includes a magnetic sensor alignable with a sector of the annular rotor and having a pair of openings extending therethrough perpendicular to the annular rotor. A support frame may be fixed on the axle in alignment with the annular rotor and has a U-shaped portion including a back wall and a pair of side walls with an opening therebetween facing the annular rotor.

18 Claims, 3 Drawing Figures

WHEEL SPEED SENSOR MODULE ASSEMBLY

BACKGROUND OF THE INVENTION

1. Field of the Invention

This invention relates to a wheel speed sensor and, more specifically, to such a sensor having a novel mounting configuration for its magnetic sensor means which enables the sensor to be self-adjusting when installed and maintained in alignment through operation.

2. Description of the Prior Art

Modern anti-lock vehicle brake control systems operate in response to electrical signals indicative of the angular velocity of one or more of the vehicle wheels. Usually these signals are derived from an electromagnetic sensor, including a magnet carried by a stationary portion of the vehicle such as the axle housing and a toothed or notched metal ring which rotates with the wheel opposite the magnet. As the ring teeth pass the magnetic sensor device, the resulting variations in flux produce a voltage, the frequency of which is a function of the angular velocity of the wheel and number of teeth in the ring.

To produce the required voltage level of the velocity signal, the sensor and ring must be precisely located with respect to each other during assembly of the wheel on the axle, and must remain in a preselected relationship even after extended operation in which the components are subjected to road shocks and constant vibration. It is also essential that installation of the sensor assembly be accomplished in a manner adaptable to mass production methods to minimize the need for skilled technicians and elaborate installation techniques.

There have heretofore been utilized wheel speed sensors, such as those disclosed in U.S. Pat. Nos. 3,772,548 and 3,774,061, in an effort to provide configurations which satisfy the above-stated requirements.

SUMMARY OF THE INVENTION

Accordingly, the primary object of this invention resides in the provision of novel, self-adjusting, vehicle wheel speed sensor mechanism in which the stationary component of the mechanism is automatically adjusted to a predetermined precise relationship with the rotating component of the mechanism as the wheel is mounted on an axle and maintained in that predetermined relationship during operation of the vehicle.

Another object of the invention resides in the provision of a novel, self-adjusting wheel speed sensor mechanism which facilitates installation of the sensor components and assures that the components are positioned and maintained in proper predetermined relationship to produce an accurate velocity signal.

A further object of the invention resides in the provision of a novel, self-adjusting wheel speed sensing mechanism in which the stationary and rotating sensing components are separately mounted on an axle and a wheel, automatically adjusted to a precise predetermined relationship as the wheel is mounted on the axle, and maintained in that predetermined relationship during operation of the vehicle. Consequently, the sensing components may be quickly and easily mounted on the axle and wheel, and the wheel may be rapidly installed on the axle by unskilled technicians employing routine installation techniques.

To accomplish these and other objects of the invention a preferred embodiment thereof is in the form of a magnetic sensor module for a wheel speed sensor assembly. The wheel speed sensor is of a type which is capable of being installed in association with a wheel rotatably mounted on an axle and includes an annular rotor means adapted to be coaxially aligned with and connected to the wheel for rotation therewith. The magnetic sensor module includes a magnetic sensor means alignable with the sector of the annular rotor means. A support frame of the sensor module is adapted to be fixed on the axle in alignment with the annular rotor means and has post means extending therefrom toward the annular rotor means to be generally parallel with the axis of the axle when the support frame is fixed on the axle. The magnetic sensor means includes means for receiving the post means therein with friction means therebetween so that the magnetic sensor means may be moved axially by the annular rotor means during installation of the assembly to establish a predetermined axial signal distance therebetween and the friction means will maintain the magnetic sensor means within the predetermined axial signal distance in alignment with the annular rotor means throughout operation of the assembly.

DETAILED DESCRIPTION OF THE PREFERRED EMBODIMENT

Figure 1:
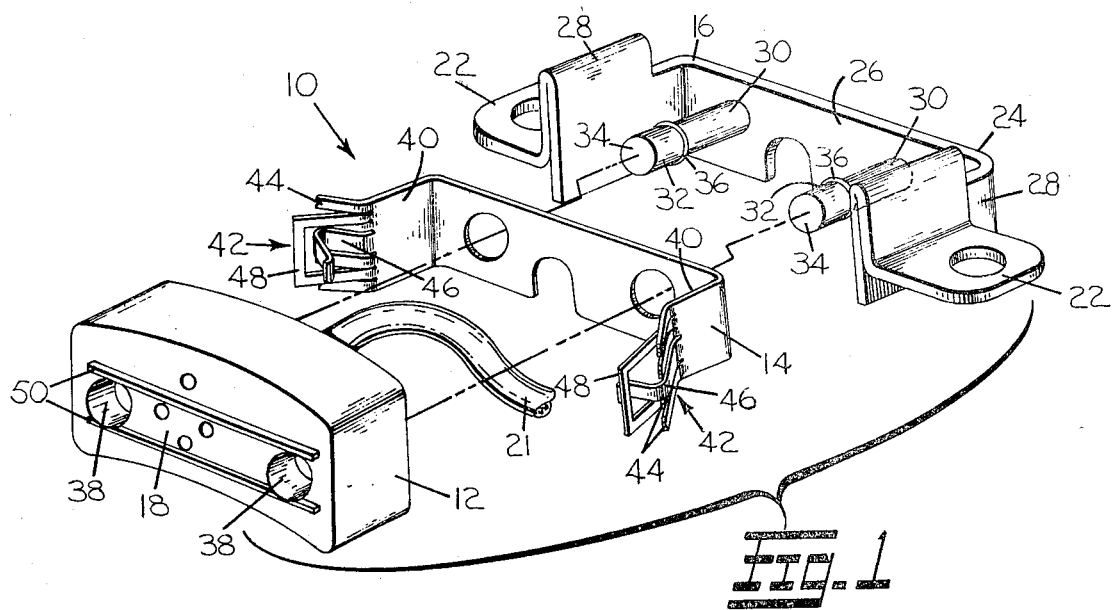
FIG. 1 is a perspective view of the preferred embodiment including various features of the invention.

As seen in FIG. 1, the preferred magnetic sensor module 10 for a wheel speed sensor assembly primarily includes a magnetic sensor device 12, a retaining member 14 and a support frame 16. The wheel speed sensor assembly in which the module 10 is intended for installation is like that shown in U.S. Pat. No. 3,772,548. In this prior art assembly a rotor ring or annulus having surface discontinuities is coaxially mounted on the wheel for rotation therewith. The module disclosed therein is mounted by a bracket assemble of the axle so that the magnetic sensor device is aligned with the rotor ring where it can be axially positioned adjacent the rotor ring by inward movement of the wheel during installation.

Accordingly, the preferred magnetic sensor device 12 of the present invention also has an arcuate shape and includes a face 18 intended to make contact with a rotor ring or annulus (shown in dotted lines at 20 in FIGS. 2 and 3) during installation and initial operation of the assembly. An electromagnetic sensing means (not shown) within the device 12 is capable of sending a speed signal through wiring 21 to an anti-lock brake control system of the like.

To provide a fixed support for the device 12, the support frame 16 includes a pair of flanges 22 having bolt holes extending therethrough for fixedly mounting the frame 16 to brackets on the axle (not shown). The support frame 16 further includes a U-shaped portion 24 having a rear wall 26 and a pair of side walls 28 so that the opened side will be aligned with the rotor annulus 20 when secured to the axle. Extending from the back wall 26 are a pair of posts 30, which in the preferred embodiment have a circular cross-section. Each post 30 includes a rubber boot 32 positioned over its extended end 34. The boot 32 has a raised cushion and friction portion 36 which encircles the intermediate portion of the post 30. The significance of the circular cross-section and the boot 32 will be explained in detail hereinbelow.

To mount the magnetic sensor device 12 for axial movement with respect to the frame 16 during installation but to restrict radial movement during operation to insure alignment with the ring 20, the device 12 has a pair of spaced openings 38 extending therethrough and generally aligned with the post 30 to snugly receive them therein. To be received within the opening 38, the portion 36 of the boot 32 must be resiliently compressed to thereby provide frictional and cushioned contact between the device 12 and the frame 16. It can be seen that for some installations the retaining member 14 of FIG. 1 could be eliminated since frictional and alignment forces generated between the device 12 and the frame 16 by the post and opening means described hereabove could fully satisfy the mounting requirements. With or without a retaining member 14 the cross-sections of the posts and openings need not be circular but might be any shape or in any number which would provide multi-directional contact for accurately positioning and maintaining the device 12 in alignment with the rotor 20.

The circular cross-section has been utilized for the preferred module 10 because it obviously facilitates the even distribution of forces in all directions, is less likely to require rigid manufacturing tolerances, and readily receives and retains an elastomer or rubber boot such as the preferred boot 32. An alternative to the use of a boot 32 in the basic post and opening configuration might include the provision of post members which have a plurality of resilient sectors which would have to be inwardly deflected to be received within the opening of the magnetic sensor device. The sectors would apply opposing forces to the interior of the opening which would properly locate the device and would at the same time provide frictional contact with the interior of the opening for resistance to axial movement during sensor operation.

However, in the preferred embodiment 10, retention is not accomplished by the post and opening configuration alone as additional frictional and locating means is provided by the retaining member 14. The preferred retaining member 14 is stamped and formed from resilient sheet metal to be generally U-shaped to receive the magnetic sensor device 12 between a pair of side sections 40. The remainder of the retaining member 14 provides support for the device 12, but is structured to prevent interference with the function and operation of the post and opening means.

Each side section 40 includes an outwardly biased spring portion 42 which, with the device 12 retained by the member 14, must be inwardly deflected between the side walls 28 of the support frame 16. The spring portions 42 generate frictional contact against the walls 28 to maintain the axial position of the magnetic sensor device 12 and to insure its alignment against circumferential movement under the urging of the ring 20 that might occur during operation.

The frictional contact with each wall 28 is maintained by a plurality of fingers 44 of each spring portion 42. Although as shown in FIG. 1, each side 40 of the retaining member 14 are inclined outwardly prior to installation, localized biasing is provided to each spring portion 42 by a back-up spring 46 in addition to that generated by the natural resilience of the sides 40 to compression between the side walls 28 of the support frame 16. The spring portions 42 further include release tabs 48 which will be discussed in detail hereinbelow.

Figure 2:
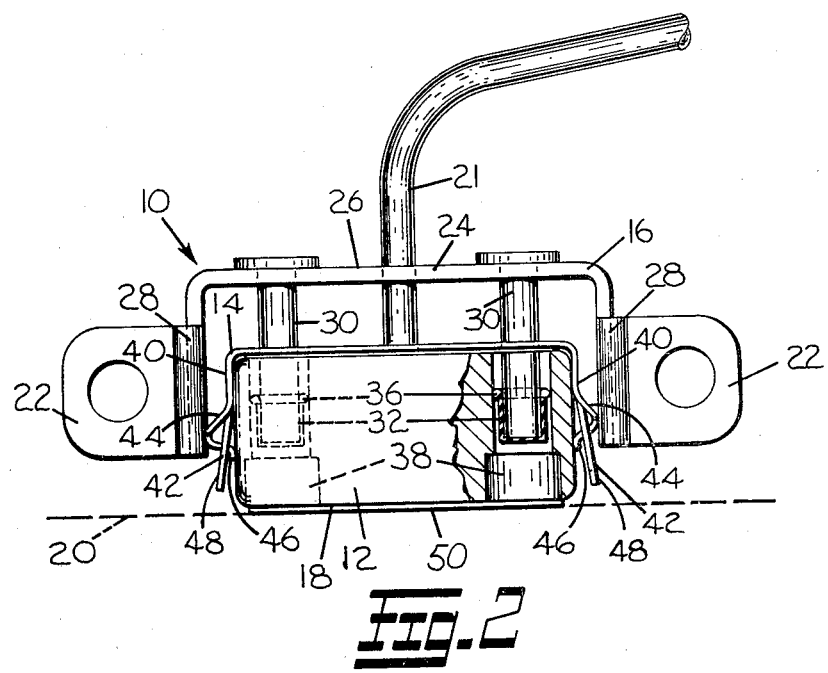
FIG. 2 is a top view of the embodiment partially in sections as installed in a wheel speed sensor assembly.
Figure 3:
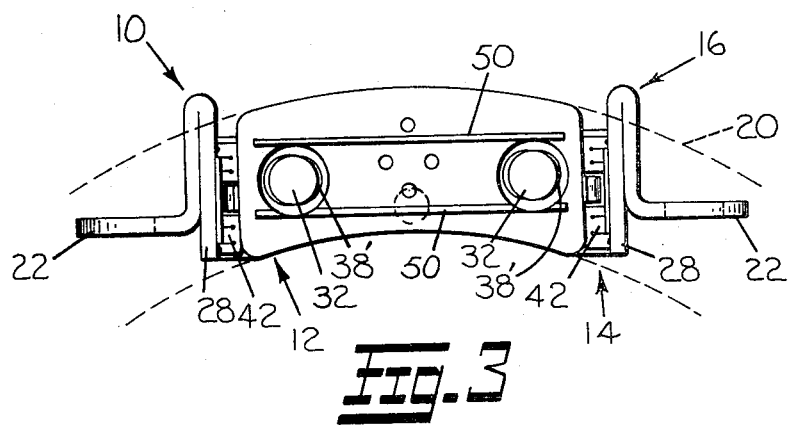
FIG. 3 is a plane elevation of another embodiment of the invention similar to that shown in FIGS. 1 and 2 but including alternative features.

To accommodate the function of the retaining member 14 to provide circumferential location and even frictional contact at both sides of the device 12, an alternative opening 38' is provided in the magnetic sensor device 12 and shown in FIG. 3 which otherwise shows features of the preferred embodiment in FIGS. 1 and 2. The opening 38' has an elliptical cross-section with its major diameter which is generally perpendicular to the radius of the ring 20 and, in the situation of the module being mounted above the axle, the major diameter will be generally horizontal. The elliptical shape insures that there will be no interference by the opening 38' and a circular post 30 with the function of the retaining member 14 but enables them to provide accurate radial positioning of the sensor device and cushioning against vertical wheel shock and vibration during operation.

The preferred magnetic module 10 is installed in the assemble prior to the installation of the wheel. With the support frame 16 secure to the axle, the magnetic sensor device 12 is positioned within the retaining member 14 as both are aligned with the support frame 16. The sensor device 12 and retaining member 14 are axially moved against frictional force into the support frame 16 until snugly retained therein. Their position is initially toward the extended end 34 of the post members 30 to insure that there will be some inward movement when the rotor and wheel are installed on the axle.

As the rotor moves inwardly, contact is made with a pair of wear ribs 50 on the surface 18 of the magnetic sensor device 12. The predetermined height of the ribs 50 insures that the rotor 20 and the electromagnetic sensing means within the device 12 are within a minimum distance of each other prior to axial movement of the sensor device 12. The device 12 and the retaining member 14 are moved inwardly of the support frame 16 until the wheel and rotor are properly installed. The friction generated at the various locations between the sensor device 12 and the retaining member 14 and the support frame 16 insure their axial position is maintained through normal operation of the assembly. The frictional force resisting inward movement during installation of the preferred module 10 has been found to be within a range of 40 to 100 pounds which is sufficient to prevent undesired axial movement by vibration or wheel shock during normal operation of the assembly.

The wear ribs 50 are further provided to accommodate for stored elastic deflection of the rotor and module mounting assembly created during installation. To allow the rotor and assembly to relax, the ribs 50 are allowed to wear away during operation of the assembly. Reducing the distance between the rotor and the electromagnetic sensor means which is initially established during installation does not adversely affect the operation of the assembly and the relaxation of the rotor and assembly insures that the magnetic sensor device 12 will only be subjected to normal vibration and shock.

It should be apparent that if the wheel is removed for maintenance, the device 12 and retaining member 14 will have to be moved outwardly to insure proper axial positioning is again obtained when the wheel is reinstalled. Because of this requirement the use of the retaining member 14 is desired in the preferred module 10 rather than a post and opening configuration alone as was discussed above since it provides a means for controlled reduction in friction which is not inherent in the post and opening configuration.

By compressing the spring portions 42 at the tabs 48, the frictional retaining force is reduced to about half. This allows the device 12 and the retaining member 14 to be more easily repositioned but allows the greater frictional force to be maintained throughout installation and operation of the assembly.

While there has been shown and described herein various preferred embodiments of the invention, it will be obvious to those skilled in the art that changes and modifications may be made therein without departing from the claimed invention.

I claim:

1. A magnetic sensor module for a wheel speed sensor assembly which said assembly is capable of being installed in association with a wheel rotatably mounted on an axle and includes an annular rotor means adapted to be coaxially aligned with and connected to said wheel for rotation therewith, said magnetic sensor module comprising:

magnetic sensor means alignable with a sector of said annular rotor means;

a support frame adapted to be fixed on said axle in alignment with said annular rotor means and having post means extending therefrom toward said annular rotor means to be generally parallel with the axis of said axle when said support frame is fixed on said axle;

said magnetic sensor means having means for receiving said post means therein; and friction means between said post means and said means for receiving said post means whereby said magnetic sensor means may when said posts means are received in said means for receiving said post means be moved axially by said annular rotor means during installation of said assembly to establish a predetermined axial signal distance therebetween and said friction means will maintain said magnetic sensor means within said predetermined signal distance in alignment with said annular rotor means throughout operation of said assembly.

2. A magnetic sensor module as set forth in claim 1 wherein said friction means includes means for cushioning said magnetic sensor means to protect it from vibration during operation of said assembly.

3. A magnetic sensor module as set forth in claim 2 wherein said post means includes a pair of parallel posts displaced one from the other and said means for receiving said post means includes a pair of openings extending into said magnetic sensor means.

4. A magnetic sensor module as set forth in claim 3 wherein said posts and said openings have a circular cross-section.

5. A magnetic sensor module as set forth in claim 3 wherein said friction and cushioning means includes a portion of resiliently compressible material which encircles each said post and must be compressed to allow said post to be received within its respective said opening of said magnetic sensor means.

6. A magnetic sensor module as set forth in claim 5 wherein said posts and said openings have a circular cross-section.

7. A magnetic sensor module as set forth in claim 1 wherein said magnetic sensor means includes a surface which faces said annular rotor means and against which contact is made during said installation to establish said predetermined axial signal distance, said surface being capable of being worn away during said operation of said assembly by said annular rotor means which is subjected to elastic deformation during said installation and until said annular rotor means returns to an undeformed state.

8. A magnetic sensor module as set forth in claim 1 further including an additional friction member disposable between a pair of interior side walls of said support frame and a pair of outside walls of said magnetic sensor means during said installation to further insure said magnetic sensor means will be maintained within said predetermined signal distance throughout said operation of said assembly.

9. A magnetic sensor module for a wheel speed sensor assembly which said assembly is capable of being installed in association with a wheel rotatably mounted on an axle and includes an annular rotor means adapted to be coaxially aligned with and connected to said wheel for rotation therewith, said magnetic sensor module comprising:

magnetic sensor means alignable with a sector of said annular rotor means and having a pair of generally parallel openings extending therein which are angularly displaced one from the other along said annular rotor means and generally perpendicular thereto when said magnetic sensor means is aligned with said annular rotor means;

a support frame adapted to be fixed on said axle in alignment with said annular rotor means and having a generally U-shaped portion including a back wall and a pair of side walls with an opening therebetween facing said annular rotor means when said frame is installed in said assembly, said support frame having a pair of post members which are generally parallel with each other and with said axle and secured to said back wall and extend therefrom into said opening;

a retaining member having a pair of side sections to retainably receive said magnetic sensor means therebetween, said side sections having outwardly biased spring portions; and said retaining member with said magnetic sensor means retained therein being capable of being received within said opening of said support frame as said spring portions apply frictional force to said side walls and said posts are respectively snugly received within said openings of magnetic sensor means, whereby said magnetic sensor means may be moved axially by said annular rotor means during installation of said assembly to establish a predetermined axial signal distance therebetween and said frictional contact of said retaining member and said magnetic sensor means with said support frame maintains said magnetic sensor means within said predetermined axial signal distance in alignment with said annular rotor means throughout normal operation of said assembly.

10. A magnetic sensor module as set forth in claim 9 wherein at least one of said pair of said openings and said pair of said post members includes a portion of resiliently deformable material to cause said posts to be snugly received within said openings, said portion of resiliently deformable material providing cushioning for said magnetic sensor means to protect it from vibration during operation of said assembly.

11. A magnetic sensor module as set forth in claim 10 wherein said portion of resiliently deformable material is an elastomer which is secured to and encircles each said post member and is compressed when said post members are received within said openings.

12. A magnetic sensor module as set forth in claim 11 wherein a generally horizontal cross-sectional dimension of said opening is sufficiently greater than a corresponding horizontal cross-sectional dimension of said post members so that said compression of said portion is limited to a generally vertical direction.

13. A magnetic sensor module as set forth in claim 12 wherein the cross-section of said post member is circular and the cross-section of said opening is elliptical with its major diameter being said generally horizontal cross-sectional dimension.

14. A magnetic sensor module as set forth in claim 9 wherein said spring portion includes a plurality of outwardly extending fingers which terminate at and make gripping contact with said side wall of said support frame to apply said friction force.

15. A magnetic sensor module as set forth in claim 14 wherein said spring portion includes an inwardly curved local spring adjacent said fingers which makes contact with said magnetic sensor means to contribute to the outwardly directed biasing of said spring portion toward said side wall of said support frame.

16. A magnetic sensor module as set forth in claim 15 wherein said spring portion includes a release tab against which outside force may be applied in opposition to said outwardly biased spring portion so that said frictional force to said side walls can be reduced to facilitate axial movement of said magnetic sensor means in a direction toward said wheel when said wheel is removed from said axle.

17. A magnetic sensor module as set forth in claim 16 wherein said retaining member is stamped and formed or resiliently deflectable sheet metal.

18. A magnetic sensor module as set forth in claim 16 wherein said opening has a cross-sectional dimension which is aligned with said spring portions and is sufficiently larger than a corresponding cross-sectional dimension of said post member to insure that the relative position of said magnetic sensor means between said side walls is governed by said spring portions.

* * * * *